US012626316B2

(12) United States Patent (10) Patent No.: US 12,626,316 B2
Villamar (45) Date of Patent: May 12, 2026

(54) SYSTEM AND METHOD EMPLOYING A VIRTUAL LEDGER FOR OPEN INNOVATION IN THE METAVERSE

(71) Applicant: Carlos R. Villamar, Falls Church, VA (US)

(72) Inventor: Carlos R. Villamar, Falls Church, VA (US)

( * ) Notice: Subject to any disclaimer, the term of this patent is extended or adjusted under 35 U.S.C. 154(b) by 314 days.

(21) Appl. No.: 18/143,576

(22) Filed: May 4, 2023

(65) Prior Publication Data

US 2023/0274376 A1 Aug. 31, 2023

Related U.S. Application Data

(63) Continuation-in-part of application No. PCT/US2021/157947, filed on Nov. 3, 2021, which is (Continued)

(51) Int. Cl.
*G06Q 50/18* (2012.01)
*G06Q 30/0283* (2023.01)

(52) U.S. Cl.
CPC ....... *G06Q 50/184* (2013.01); *G06Q 30/0283* (2013.01)

(58) Field of Classification Search
CPC .......................... G06Q 50/184; G06Q 30/0283
(Continued)

(56) References Cited

U.S. PATENT DOCUMENTS 11,188,977 B2 11/2021 Youb et al.
11,893,626 B2 2/2024 Youb et al.
(Continued)

FOREIGN PATENT DOCUMENTS

CA 3055829 A1 9/2018
EP 3593305 9/2018
WO 2018165472 A1 9/2018

OTHER PUBLICATIONS

Hooks IV, J.B. "The Mesh Economy: How Blockchain and Alternative Networks can Bridge the Digital Divide and Facilitate Economic Inclusion," Blockchain Economics: Implications of Distributed Ledgers-Markets, Communications Networks, and Algorithmic Reality, 1, (pp. 251-265). Jan. 29, 2019; available on the world wide web at openthoughtspace.pbworks.com/w/file/fetch/128952675/13_Hooks.pdf.
(Continued)

*Primary Examiner* — Bharat Barot
(74) *Attorney, Agent, or Firm* — Carlos R. Villamar; The Villamar Firm PLLC

(57) ABSTRACT

A system, method and computer program product for computer based open innovation, includes an engine server implementing an open innovation engine determining a baseline monetization based on monetization events; inventor and team member devices associated with the monetization events; smart contracts associated with the monetization events; and portfolios associated with the monetization events. The inventors, and team members enter into respective smart contracts generated by the open innovation engine with respect to terms for development and monetization of the portfolios and which collects the baseline monetization for operating costs, and to fund further projects, is implemented with distributed technology and issues tokens based on generated valuations of the respective portfolios. When the portfolios lead to the monetization events, the tokens increase in value and the engine distributes value thereof to the baseline monetization, and the team members, and inventors, based on terms within respective smart contracts.

18 Claims, 19 Drawing Sheets

Related U.S. Application Data a continuation-in-part of application No. 17/339,586, filed on Jun. 4, 2021, now Pat. No. 11,694,195, and a continuation-in-part of application No. 16/950,408, filed on Nov. 17, 2020, now Pat. No. 11,593,481, which is a continuation-in-part of application No. 17/088,690, filed on Nov. 4, 2020, now Pat. No. 11,588,789, which is a continuation-in-part of application No. 16/846,075, filed on Apr. 10, 2020, now Pat. No. 11,510,062.

(58) Field of Classification Search
USPC ...................................................... 726/22–25
See application file for complete search history.

(56) References Cited

U.S. PATENT DOCUMENTS

| | | | |
|---|---|---|---|
| 2006/0167784 A1 | 7/2006 | Hoffberg | |
| 2010/0205025 A1* | 8/2010 | Johansen | G06Q 10/101 |
| | | | 709/204 |
| 2010/0257089 A1 | 10/2010 | Johnson | |
| 2012/0221502 A1 | 8/2012 | Jerram et al. | |
| 2013/0254298 A1 | 9/2013 | Lorphelin | |
| 2014/0280660 A1* | 9/2014 | Khandewale | G06Q 50/01 |
| | | | 709/207 |
| 2015/0170671 A1 | 6/2015 | Jerram et al. | |
| 2016/0086296 A1* | 3/2016 | Krajec | G06Q 50/184 |
| | | | 705/310 |
| 2016/0224951 A1 | 8/2016 | Hoffberg | |
| 2017/0134428 A1 | 5/2017 | Vazquez Carames | |
| 2017/0232300 A1 | 8/2017 | Tran et al. | |
| 2020/0394652 A1 | 12/2020 | Youb et al. | |
| 2022/0261882 A1 | 8/2022 | Youb et al. | |
| 2025/0166102 A1* | 5/2025 | O'Malley | G06Q 50/184 |

OTHER PUBLICATIONS

De La Rosa, J.L. et al. "A Survey of Blockchain Technologies for Open Innovation," In Proceedings of the 4th Annual World Open Innovation Conference. Preprint (pp. 1-27). Mar. 15, 2019; available on the world wide web at easychair.org/publications/preprint_download/168g.

PCT Ser. No. PCT/US21/57947; ISR & WO; mailed Feb. 4, 2022.

PCT International Search Report & Written Opinion, Ser. No. PCTUS2027809, Jul. 6, 2020.

European search report of Jan. 12, 2022; 20787968.5-1218 / 3953816 PCT/US2020027809.

Basile C et al: "Neutralization of Errors and Attacks in Wireless Ad Hoc Networks", Dependable Systems and Networks, 2005. DSN 2005. Proceedings. International Conference on Yokohama, Japan 28-1, Jun. 2005, Piscataway, NJ, USA, IEEE, Jun. 28, 2005 (Jun. 28, 2005), pp. 518-527, XP010817828, DOI: 10.1109/DSN.2005.68 ISBN: 978-0-7695-2282-1.

Salman Tara et al: "Probabilistic Blockchains: A Blockchain Paradigm for Collaborative Decision-Making", 2018 9th IEEE Annual Ubiquitous Computing, Electronics & Mobile Communication Conference (UEMCON), IEEE, Nov. 8, 2018 (Nov. 8, 2018), pp. 457-465, XP033595867, DOI: 10.1109/UEMCON.2018.8796512 [retrieved on Aug. 13, 2019].

* cited by examiner

ENGINE AND PORTFOLIO VIEW

ENGINE AND CONTRACT VIEW

INVENTOR AND ENGINE VIEW

Monetization 2
304

Inventor 4
314

Team Member n
312

Inventor n
314

Portfolio n
310

Monetization n
304

Contract n
308

Monetization 1
304

Open Innovation
Engine
302

MONETIZATION VIEW

300

Figure 8:
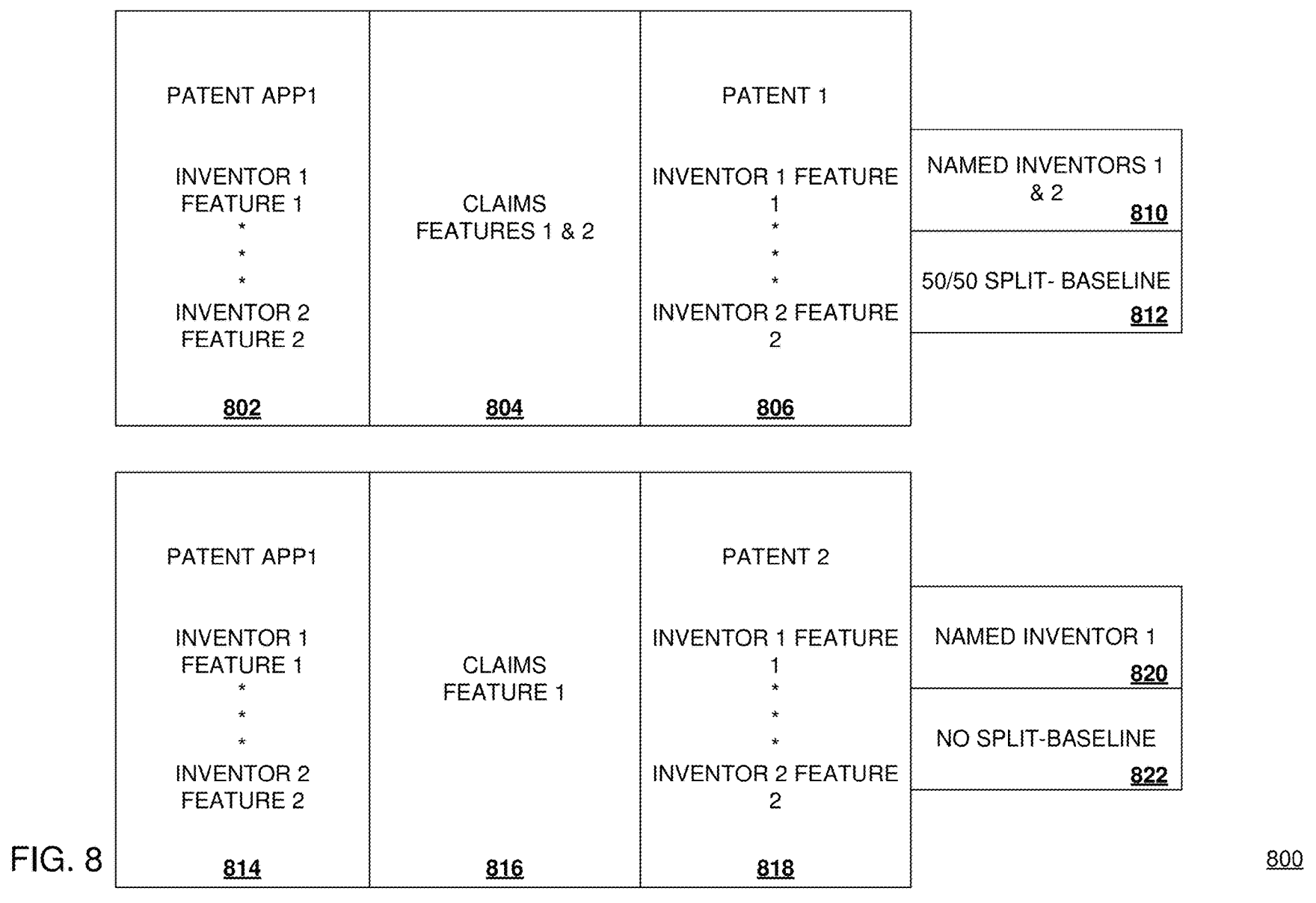

800

| PATENT APP1 | | PATENT 1 | | NAMED INVENTORS 1 & 2     810 |
|---|---|---|---|---|
| INVENTOR 1 FEATURE 1 | | | INVENTOR 1 FEATURE 1 | |
| * | CLAIMS FEATURES 1 & 2 | | * | |
| * | | | * | |
| * | | | * | |
| INVENTOR 2 FEATURE 2 | | | INVENTOR 2 FEATURE 2 | 50/50 SPLIT - BASELINE     812 |
| 802 | 804 | | 806 | |

| PATENT APP1 | | PATENT 2 | | NAMED INVENTOR 1     820 |
|---|---|---|---|---|
| INVENTOR 1 FEATURE 1 | | | INVENTOR 1 FEATURE 1 | |
| * | CLAIMS FEATURE 1 | | * | |
| * | | | * | |
| * | | | * | |
| INVENTOR 2 FEATURE 2 | | | INVENTOR 2 FEATURE 2 | NO SPLIT-BASELINE     822 |
| 814 | 816 | | 818 | |

| TOKEN 1306 |
| VALIDATE 1310 |

1302

1308

1304

Wallet 1314

606

MINT NFT 1304 TO WALLET 1314
1402

GENERATE TOKEN 1306 ON NFT MINT/SALE
1404

SHIP ART 1302 WITH TOKEN 1306
1406

WALLET 1314 VALIDATES OWNERSHIP OF ART 1302 WITH TOKEN 1306
1408

PROOF OF VALIDATION ON DB/BC
1410

NFT RESALE/TRANSFER?
1412

YES

NO

END

1300

SYSTEM AND METHOD EMPLOYING A VIRTUAL LEDGER FOR OPEN INNOVATION IN THE METAVERSE

CROSS REFERENCE TO RELATED DOCUMENTS

The present disclosure is a continuation-in-part of PCT Patent Application Serial No. PCT/US21/57947 of Villamar et al., entitled "SYSTEM AND METHOD EMPLOYING VIRTUAL LEDGER WITH NON-FUNGIBLE TOKEN (NFT) GENERATION, LIQUIDITY POOLS AND CAMPAIGNS," filed on 3 Nov. 2021, now co-pending, which claims priority to U.S. patent application Ser. No. 17/339,586 of Kerseboom et al., entitled "SYSTEM AND METHOD EMPLOYING VIRTUAL LEDGER WITH NON-FUNGIBLE TOKEN (NFT) GENERATION," filed on 4 Jun. 2021, now allowed, U.S. patent application Ser. No. 16/950,408 of Kerseboom et al., entitled "SYSTEM AND METHOD EMPLOYING VIRTUAL LEDGER," filed on 17 Nov. 2020, now U.S. Pat. No. 11,593,481, and U.S. patent application Ser. No. 17/088,690 of Kerseboom et al., entitled "SYSTEM AND METHOD EMPLOYING VIRTUAL LEDGER," filed on 4 Nov. 2020, now U.S. Pat. No. 11,588,789, which claims priority to U.S. patent application Ser. No. 16/846,075 of Villamar et al., entitled "SYSTEM AND METHOD EMPLOYING VIRTUAL LEDGER," filed on 10 Apr. 2020, now U.S. Pat. No. 11,510,062, the entire disclosures of all of which are hereby incorporated by reference herein.

FIELD OF THE DISCLOSURE

The present disclosure generally relates to systems and methods for providing secure innovation in the metaverse, and more particularly to systems and methods for employing a virtual ledger for open innovation in the metaverse, and the like.

DISCUSSION OF THE BACKGROUND

In recent years, systems and methods for security for communication networks have been developed. However, such systems typically are lacking in effective incorporation of security between communications devices, and the like, in an efficient and cost-effective manner.

SUMMARY OF THE DISCLOSURE

Therefore, there is a need for a method and system that addresses the above and other problems. The above and other problems are addressed by the illustrative embodiments of the present disclosure, which provide systems and methods for computer based open innovation, includes an engine server implementing an open innovation engine determining a baseline monetization based on monetization events; inventor and team member devices associated with the monetization events; smart contracts associated with the monetization events; and portfolios associated with the monetization events. The inventors, and team members enter into respective smart contracts generated by the open innovation engine with respect to terms for development and monetization of the portfolios and which collects the baseline monetization for operating costs, and to fund further projects, is implemented with distributed technology and issues tokens based on generated valuations of the respective portfolios. When the portfolios lead to the monetization events, the tokens increase in value and the engine distributes value thereof to the baseline monetization, and the team members, and inventors, based on terms within respective smart contracts.

Accordingly, in illustrative aspects of the present disclosure there is provided a system, method and computer program product for computer based open innovation, includes an engine server implementing an open innovation engine for determining a baseline monetization based on one or more monetization events, including one of portfolio sales, and/or profits from startups, products and/or services; one or more inventor devices associated with the one or more monetization events; one or more team member devices associated with the one or more monetization events, and including one or more patent attorney team members, finance team members, and/or marketing team members; one or more smart contracts, including Blockchain smart contracts associated with the one or more monetization events; and one or more portfolios, including patent portfolios associated with the one or more monetization events. The one or more inventors, and team members enter into respective smart contracts generated by the open innovation engine with respect to terms for development and monetization of the portfolios. The open innovation engine collects the baseline monetization for operating costs, and to fund further projects. The open innovation engine is implemented with distributed technology, including blockchain technology and issues tokens based on generated valuations, including one of Artificial intelligence (AI)-based, ruled based, and blockchain-based valuations of the respective portfolios. When one or more of the portfolios lead to the monetization events, the tokens increase in value and the open innovation engine distributes value thereof to the baseline monetization, and the respective team members, and inventors, based on terms agreed to within the respective smart contracts.

The open innovation engine determines and equity split between the inventors based on the named inventors on an issued patent minus the baseline monetization.

The open innovation engine implements a gallery server that performs WEB 3.0, virtual reality (VR), and/or augmented reality (AR) services, including services for recruiting inventors, providing for patents sales, providing for non-fungible token (NFT) sales, and/or intellectual property (IP) education.

For the recruiting inventors, the gallery server provides information regarding an open innovation community at to potential inventors provided by virtual recruiting assistants, including AI powered virtual recruiting assistants and/or by actual human recruiters via a gallery server user interface.

For patents or NFT sales, the gallery server provides information regarding the patents or NFTs to potential buyers and an ability to buy the patents or NFTs via crypto wallets of the potential buyers, and the information is provided by virtual sales assistants, including AI powered virtual sales assistants and/or by actual human salesmen via a gallery server user interface.

For IP education, the gallery server provides IP education information to potential students, and the IP education information is provided by virtual teaching assistants, including AI powered virtual teachers and/or by actual human teachers via a gallery server user interface.

Still other aspects, features, and advantages of the present disclosure are readily apparent from the following detailed description, by illustrating a number of illustrative embodiments and implementations, including the best mode contemplated for carrying out the present disclosure. The present disclosure is also capable of other and different embodiments, and its several details can be modified in various respects, all without departing from the spirit and scope of the present disclosure. Accordingly, the drawings and descriptions are to be regarded as illustrative in nature, and not as restrictive.

BRIEF DESCRIPTION OF THE DRAWINGS

The embodiments of the present disclosure are illustrated by way of example, and not by way of limitation, in the figures of the accompanying drawings and in which like reference numerals refer to similar elements and in which:

FIG. 8 is a diagram for illustrative systems and methods for performing equity splits, and the like, employed in the innovation ecosystem engine of FIGS. 1-7 and 9-16;

DETAILED DESCRIPTION OF THE PREFERRED EMBODIMENTS

Figure 1:
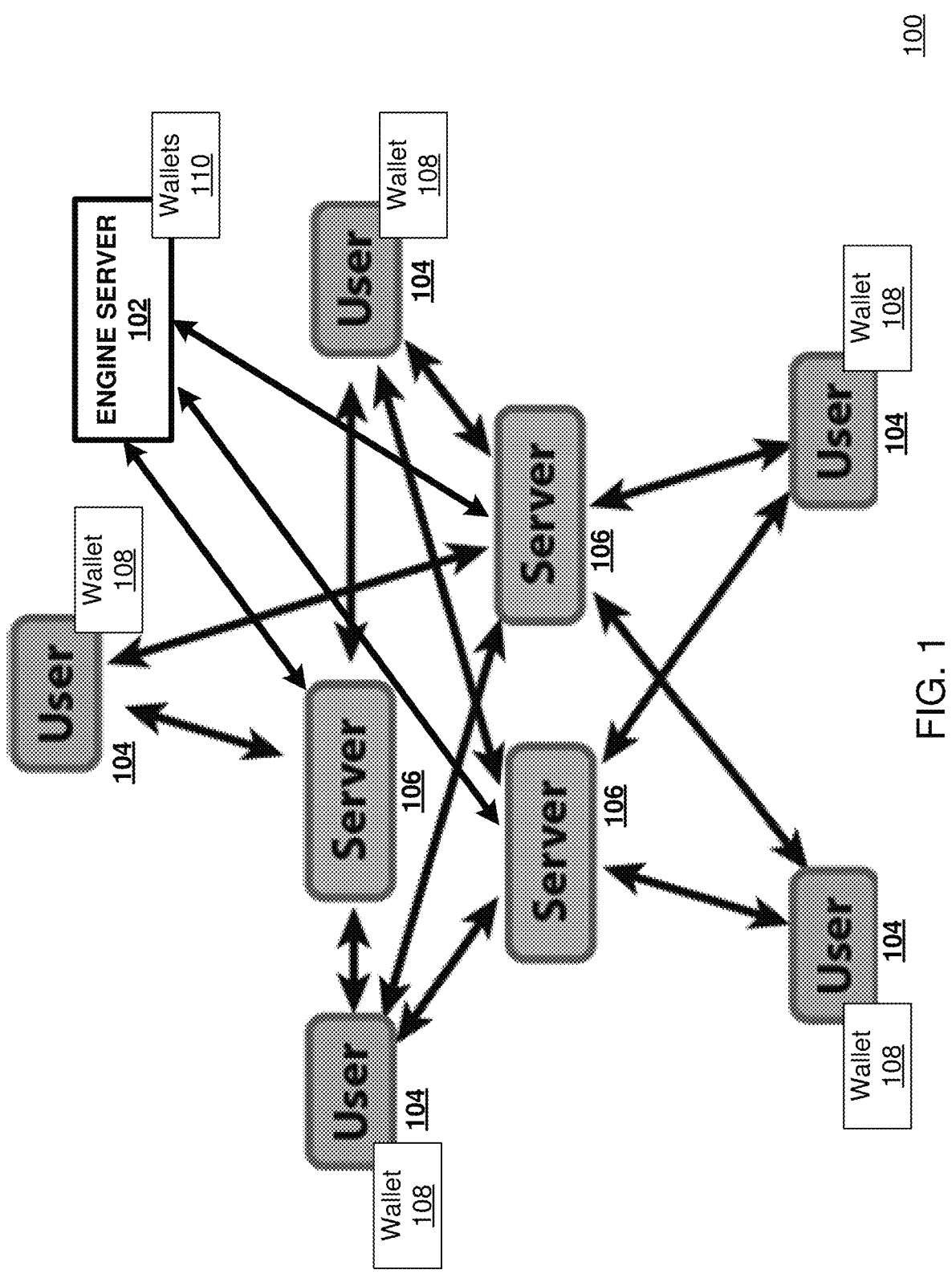
FIG. 1 is a diagram for illustrative systems and methods for distributed computing on a blockchain for an innovation ecosystem engine, and the like employed in FIGS. 2-16.

Referring now to the drawings, wherein like reference numerals designate identical or corresponding parts throughout the several views, and more particularly to FIG. 1 thereof, there is shown illustrative systems and methods 100 for distributed computing on a blockchain for an innovation ecosystem engine, and the like employed in FIGS. 2-16. In FIG. 1, the systems and methods 100 include an engine server 102, users 104, servers 106 and wallets 108. The engine server 102 communicates through servers 106 respectively coupled to the users 104. Each of the users 104 includes respective wallets 108 for doing virtual ledger, cryptocurrency transactions, and the like, via the servers 106 and the engine server 102.

Figure 2:
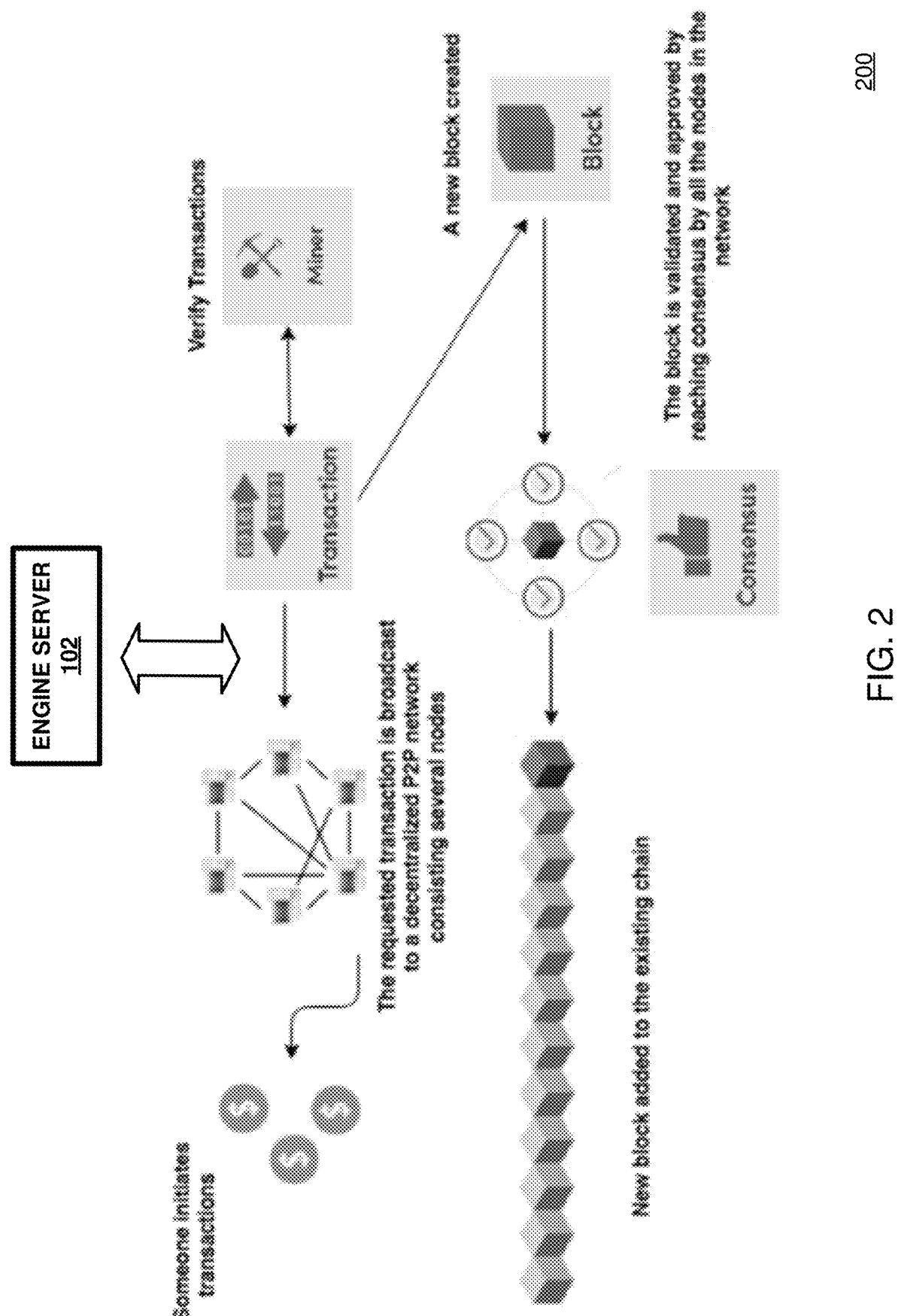
FIG. 2 is a diagram for illustrating systems and methods for the innovation ecosystem engine interfacing with a blockchain, based on FIGS. 1 and 3-16.

FIG. 2 is a diagram for illustrating systems and methods 200 for the innovation ecosystem engine interfacing with a blockchain, based on FIGS. 1 and 3-16. In FIG. 2, the systems and methods 200 include virtual ledger operations (e.g., blockchain operations, etc.), as performed by the engine server 102. The server 102 is also configured to perform various functions, such as virtual reality (VR), augmented reality (AR), user interface (UI), artificial intelligence (AI), database management functions, and the like. The AI functionality, can include TensorFlow (an open-source machine learning library developed by Google), PyTorch (an open-source machine learning library developed by Facebook), Keras (a high-level neural networks API written in Python and capable of running on top of Tensor-Flow, Theano, or CNTK), Caffe (a deep learning framework developed by the Berkeley Vision and Learning Center (BVLC)), the Microsoft Cognitive Toolkit (formerly known as CNTK, a free, open-source toolkit for deep learning developed by Microsoft), MXNet (a deep learning framework developed by Apache), Hugging Face (a platform for creating and sharing state-of-the-art models for natural language processing and computer vision), OpenAI (a research organization focused on developing advanced AI technologies and promoting their safe and beneficial use, such as ChatGPT, Midjourney, etc.), IBM Watson (a suite of AI-powered services and tools for businesses, developers, and researchers, Amazon Web Services (AWS) AI (a set of cloud-based services and tools for building and deploying AI applications), and the like.

Figure 3A:
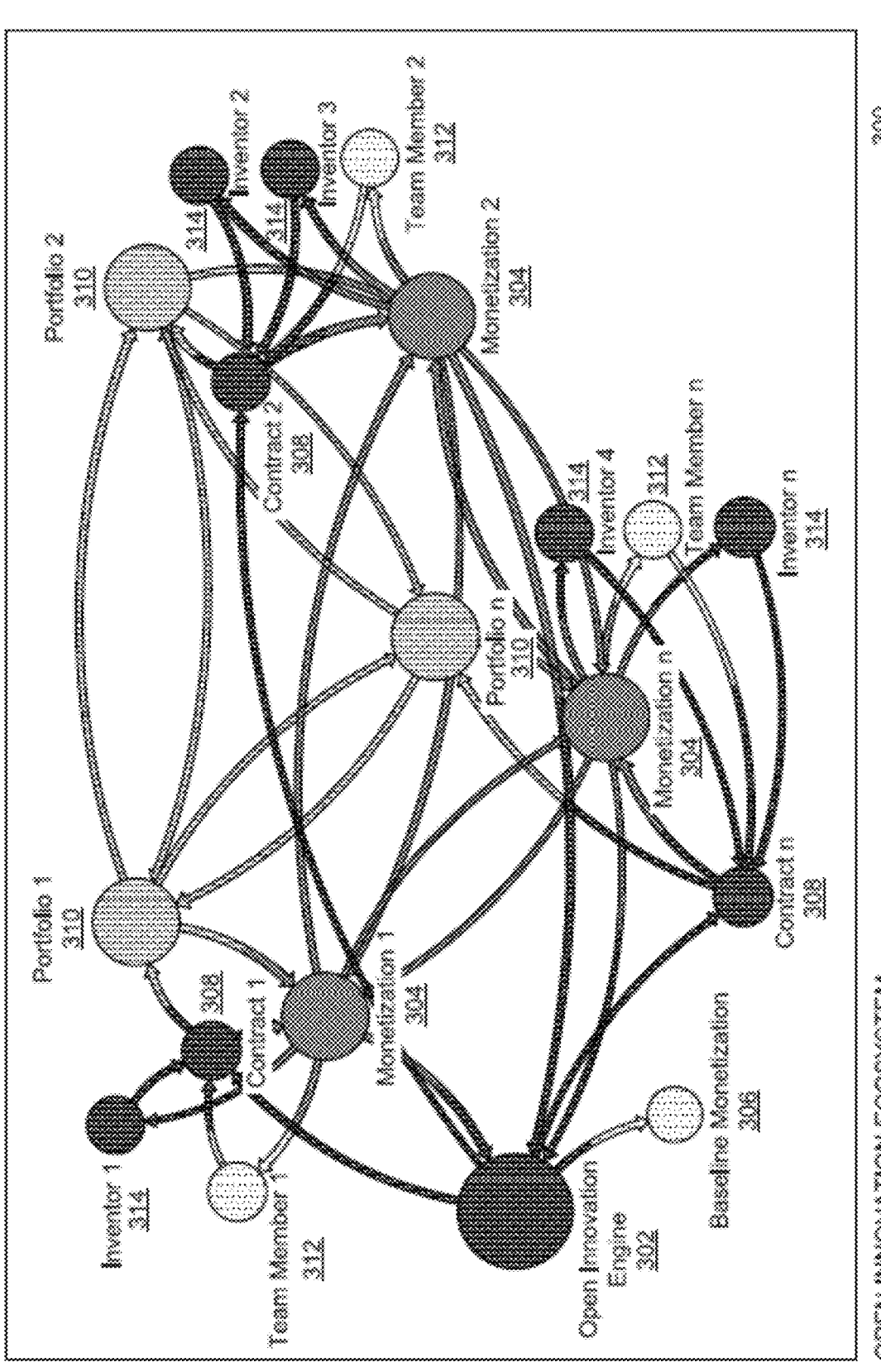
FIGS. 3A-3F are diagrams for illustrating systems and methods for the innovation ecosystem engine, based on FIGS. 1-2 and 4-16.
Figure 3B:
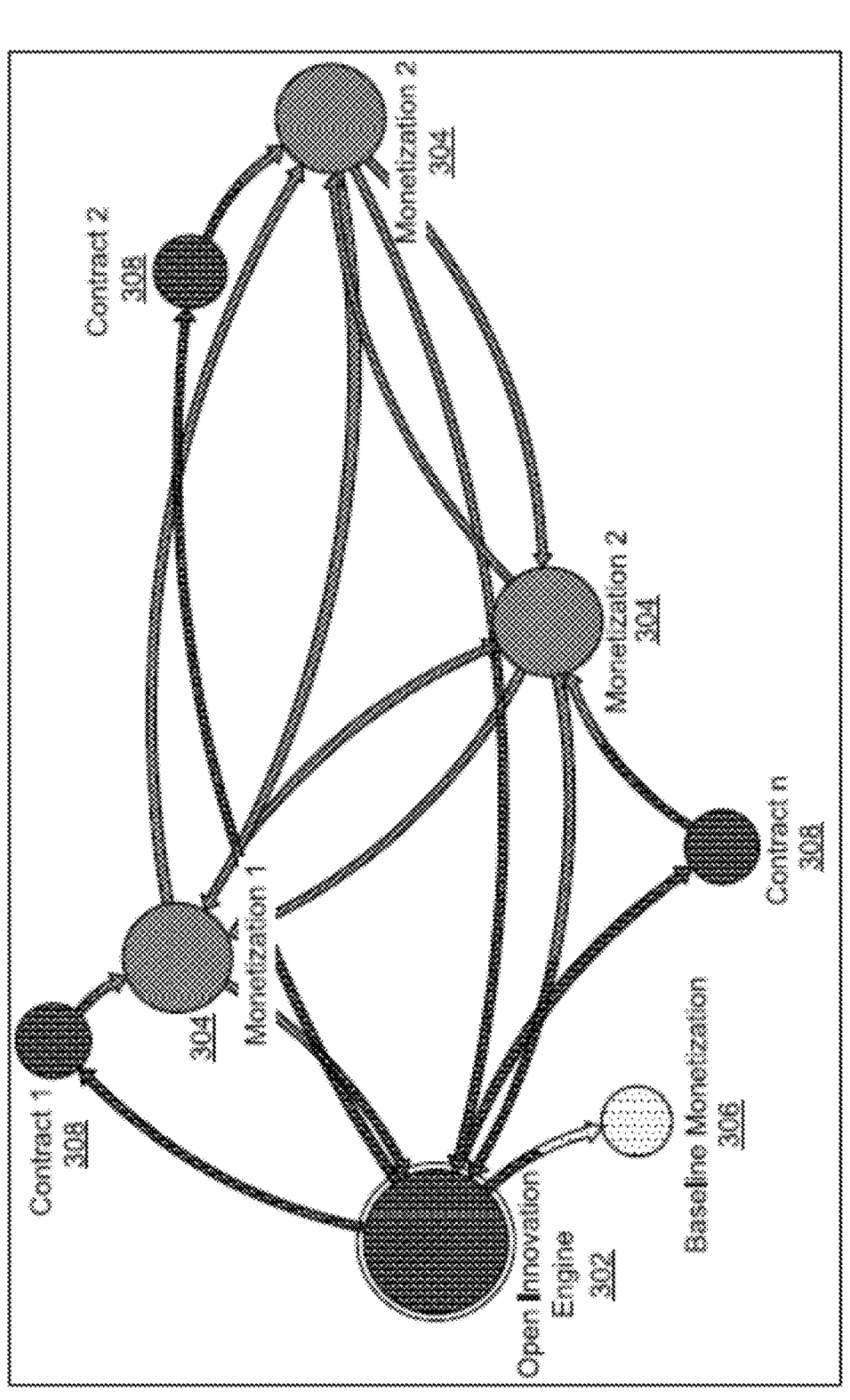

FIGS. 3A-3F are diagrams for illustrating systems and methods 300 for the innovation ecosystem engine, based on FIGS. 1-2 and 4-16. In FIG. 3A, the systems and methods for the open innovation ecosystem 300 can include the engine server 102 implementing an open innovation engine 302, with a baseline monetization 306 (e.g., 10%, etc.), one or more monetization events (e.g., portfolio sales, profits from startups, products and/or services, etc.) 304, one or more inventors 314, one or more team members 312 (e.g., patent attorney team members, finance team members, marketing team members, etc.), one or more smart contracts 308 (e.g., Blockchain smart contracts, etc.), and one or more portfolios (e.g., patent portfolios, etc.) 310. Accordingly, the one or more groups of inventors 314, and team members 312 can enter into respective smart contracts 308 with respect to terms for development and the monetization 304 of the portfolios 310. The open innovation engine 302 collects a baseline monetization 306 for operating costs, to fund further projects, and the like. As the open innovation ecosystem 300 is based on distributed technology (e.g., blockchain, etc.), tokens (not shown) can be issued based on computer generated valuations (e.g., AI-based, ruled based, blockchain-based, etc.) of the respective portfolios 310, and the like. When one or more of the portfolios 310 lead to the monetization events 304, the tokens can increase in value and be distributed to the baseline monetization 306, and the respective team members 312, and the inventors 314, based on terms agreed to within the respective smart contracts 308.

Figure 3C:
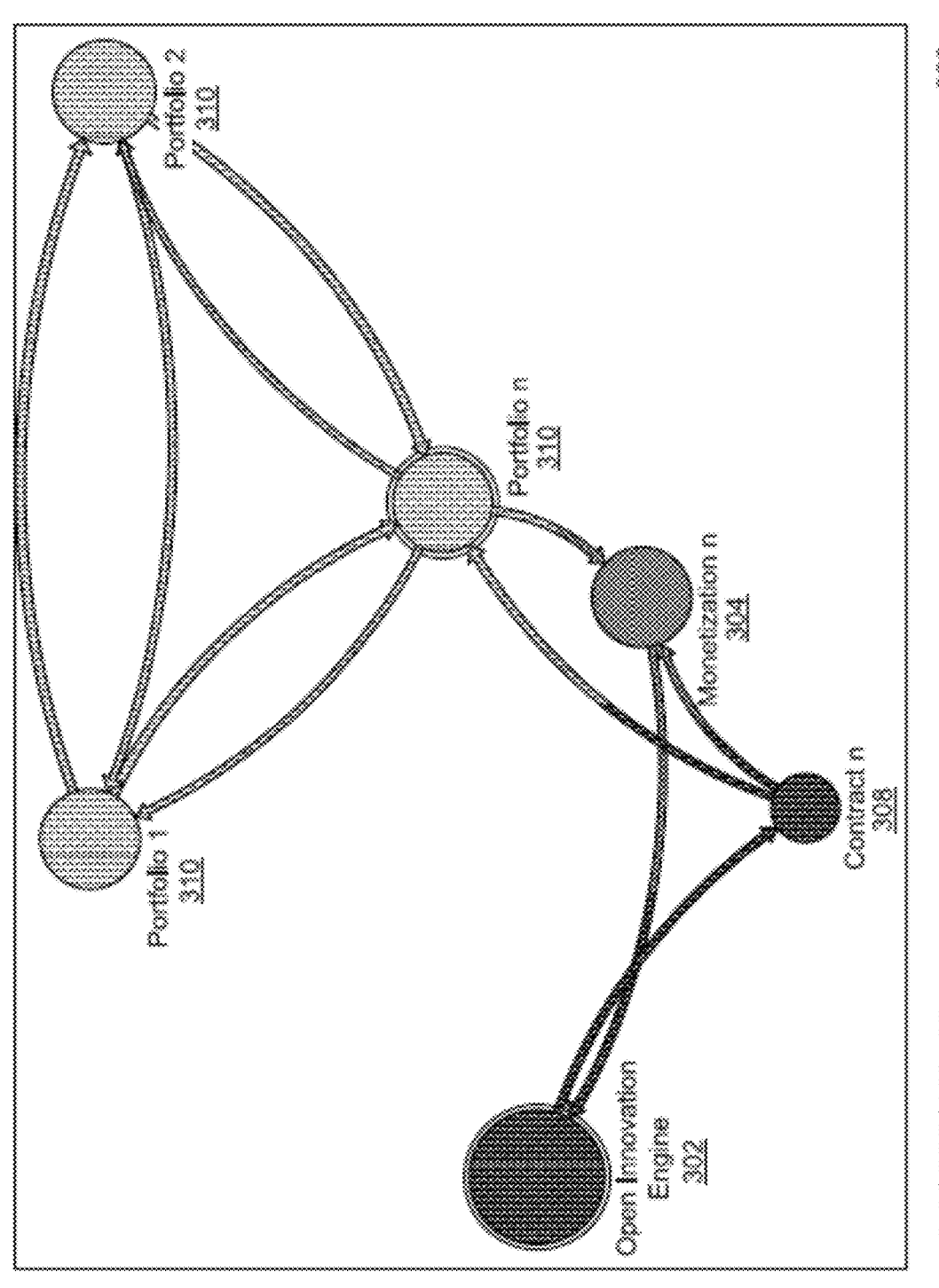
Figure 3D:
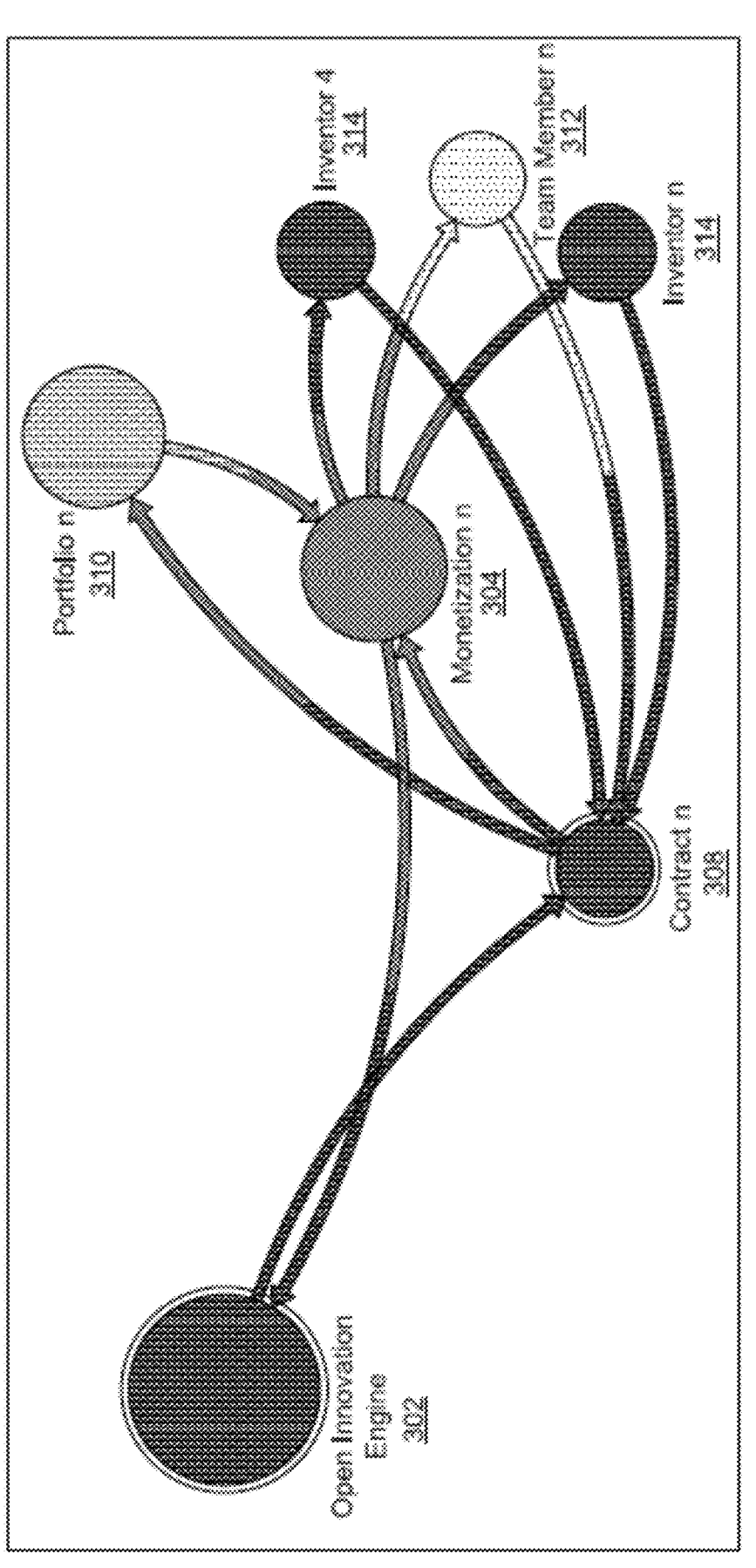
Figure 3E:
Figure 3F:

FIGS. 3B-3F are used to illustrate various views from the various components of the open innovation ecosystem 300 of FIG. 3A. For example, in FIG. 3B, there is illustrated a view from the open innovation engine 302 point of view, with respect to the smart contracts 308, the monetization events 304, and the baseline monetization 306. In FIG. 3C, there is illustrated a view from the open innovation engine 302 and the portfolios 310 point of view, with respect to one of the smart contracts 308 with the monetization event 304, and the respective shared portfolios 310. In FIG. 3D, there is illustrated a view from the open innovation engine 302 and the contracts 308 point of view, with respect to the smart contracts 308, the corresponding monetization event 304 of the portfolio 310, and the corresponding inventors 314, and team members 312. In FIG. 3E, there is illustrated a view from the open innovation engine 302 and the inventors 314 point of view, with respect to the smart contracts 308, and the corresponding monetization event 304 of the portfolio 310 (not shown). In FIG. 3F, there is illustrated a view from the monetization event 304 point of view, with respect to the open innovation engine 302, the smart contract 308, the portfolio 310 with the monetization events 304, and with the respective inventors 314, and the team members 312.

Figure 4:
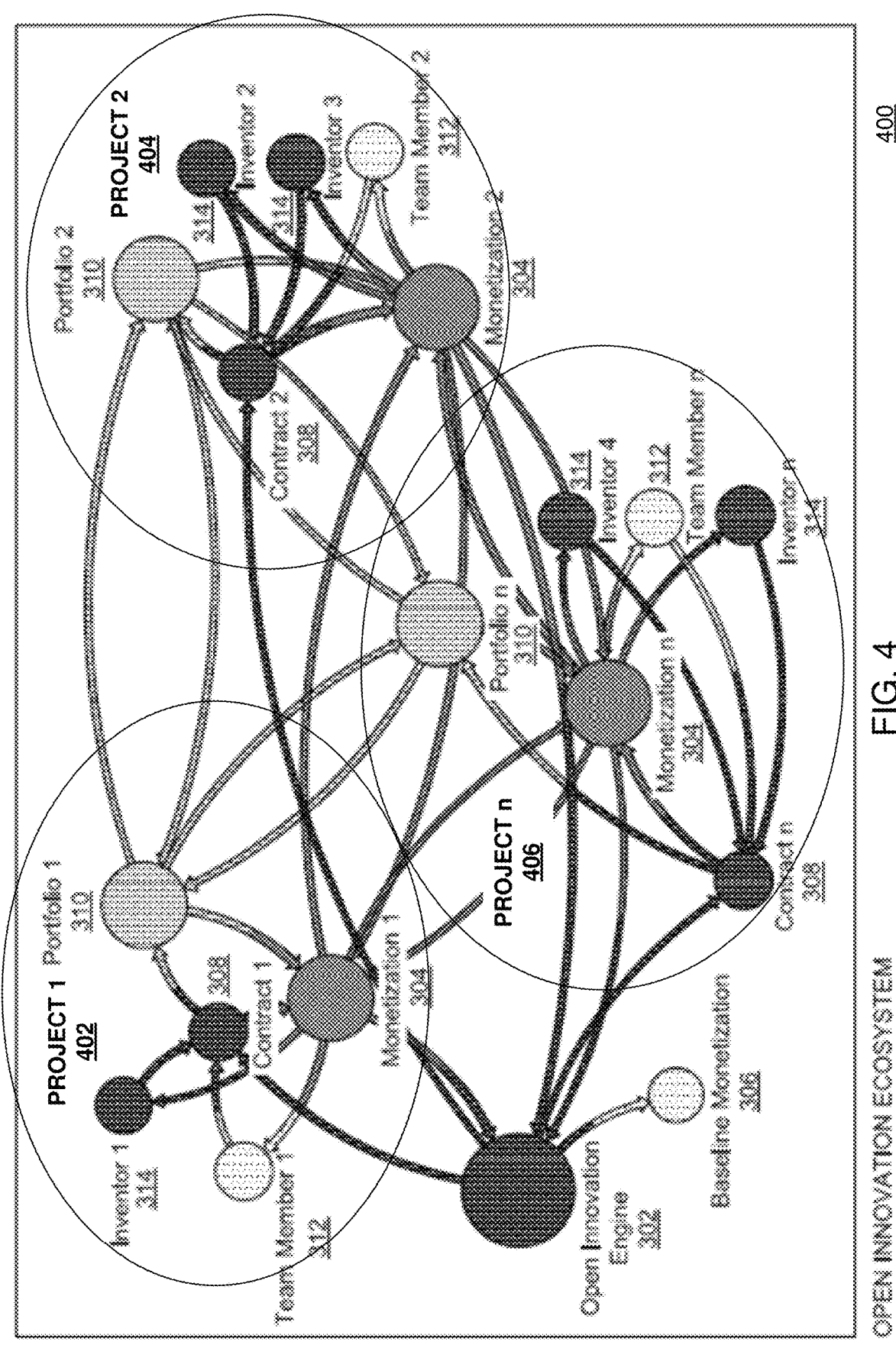
FIGS. 4-5 are diagrams for illustrating non-fungible token (NFT), and campaigns, and the like, employed in the innovation ecosystem engine of FIGS. 1-3 and 6-16.
Figure 5:
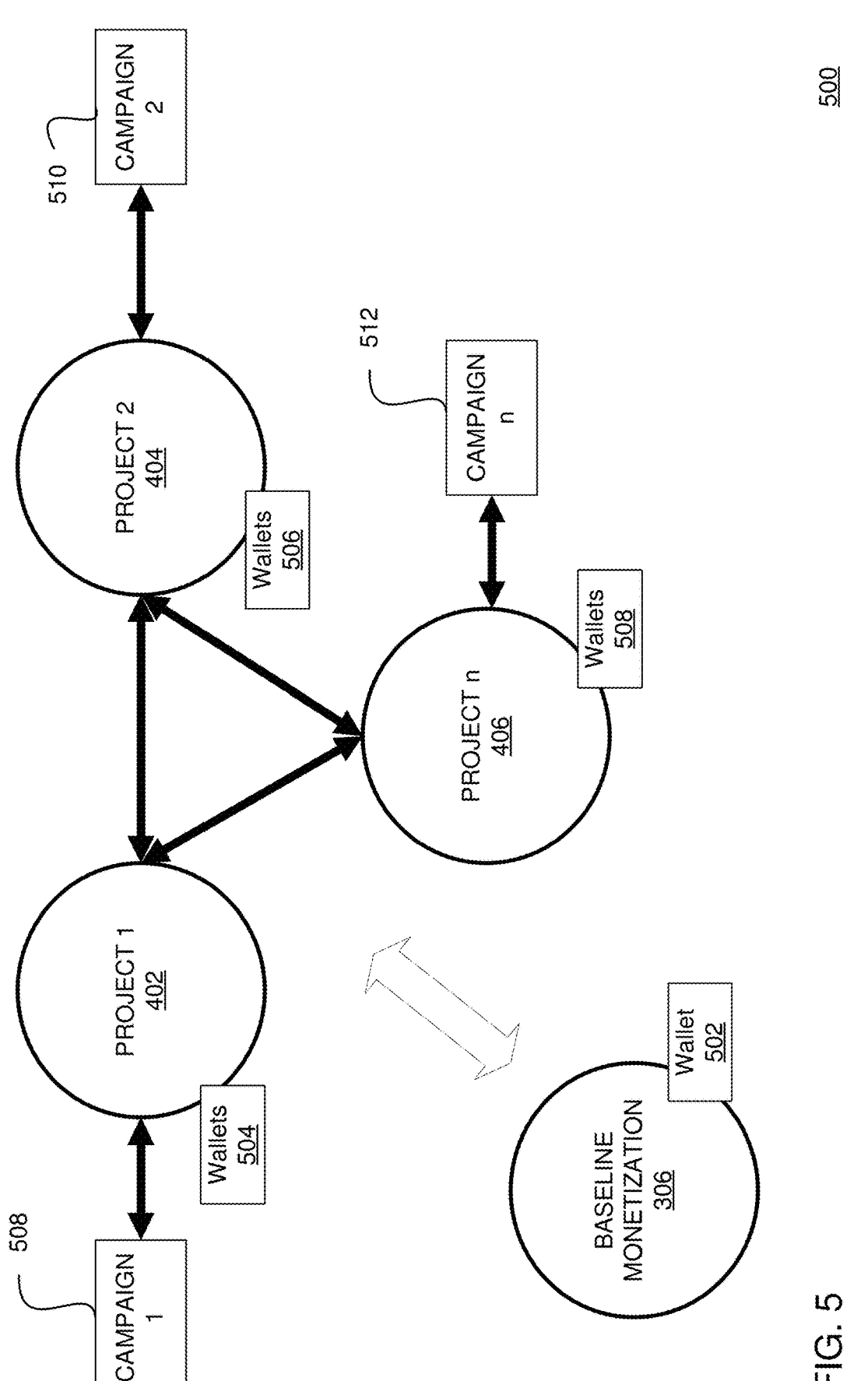

FIGS. 4-5 are diagrams for illustrating non-fungible token (NFT), and campaigns, and the like, employed in the innovation ecosystem engine of FIGS. 1-3 and 6-16. In FIGS. 4-5, for example, patent portfolios 310 are grouped into respective projects 402, 404 and 406. In addition, initial campaigns 508-512 can be launched for initial crowdfunding, and the like, of the projects 402, 404 and 406. Such campaigns 508-512 can be NFT, Kickstarter, GoFundMe, and the like, campaigns, wherein the campaigns 508-512 are employed to provide initial funds for the projects 402-406 to get started, and the like. For example, patent drawings converted to artwork, artwork related to the projects 402-406, and the like, can be minted as NFTs, and the like, to help the community initially fund a patent project, and the like, by purchasing NFTs, and the like. Advantageously, such campaign NFTs 508-512 can be used to securely fund, and the like, the projects 402, 404 and 406, and the like.

Figure 6:
FIG. 6 is a diagram for illustrative systems and methods for a gallery server, and the like, employed in the innovation ecosystem engine of FIGS. 1-5 and 7-16.

FIG. 6 is a diagram for illustrative systems and methods 600 for a gallery server, and the like, employed in the innovation ecosystem engine of FIGS. 1-5 and 7-16. In FIG. 6, the engine server 102 can implement the gallery server 600, and can perform various WEB 3.0, VR, AR, and the like services, including recruiting inventors at 602, providing for patents sales at 604, providing for NFT sales at 606, intellectual property (IP) education at 608, and the like.

For recruiting inventors at 602, the gallery server 600 can provide information regarding the open innovation community at 610 to potential inventors 622. The information 610 can be provided, for example, by virtual assistants (e.g., AI powered) and/or by an actual human via the gallery server user interface.

For patents sales at 604, the gallery server 600 can provide information 612 regarding the patents 614 to potential buyers and ability to buy the patents 614 via the wallets 108, and the like. The information 612 can be provided, for example, by virtual assistants (e.g., AI powered) and/or by an actual inventor via the gallery server user interface.

For NFT sales at 606, the gallery server 600 can provide information 616 regarding the NFTs to potential buyers and ability to buy the NFTs via the wallets 108, and the like. The information 616 can be provided, for example, by virtual assistants (e.g., AI powered) and/or by an actual NFT artist via the gallery server user interface.

For IP education at 608, the gallery server 600 can provide information 618 to potential students 624, and the like. The information 618 can be provided, for example, by virtual teachers 620 (e.g., AI powered) and/or by an actual human teachers via the gallery server user interface.

Figure 7:
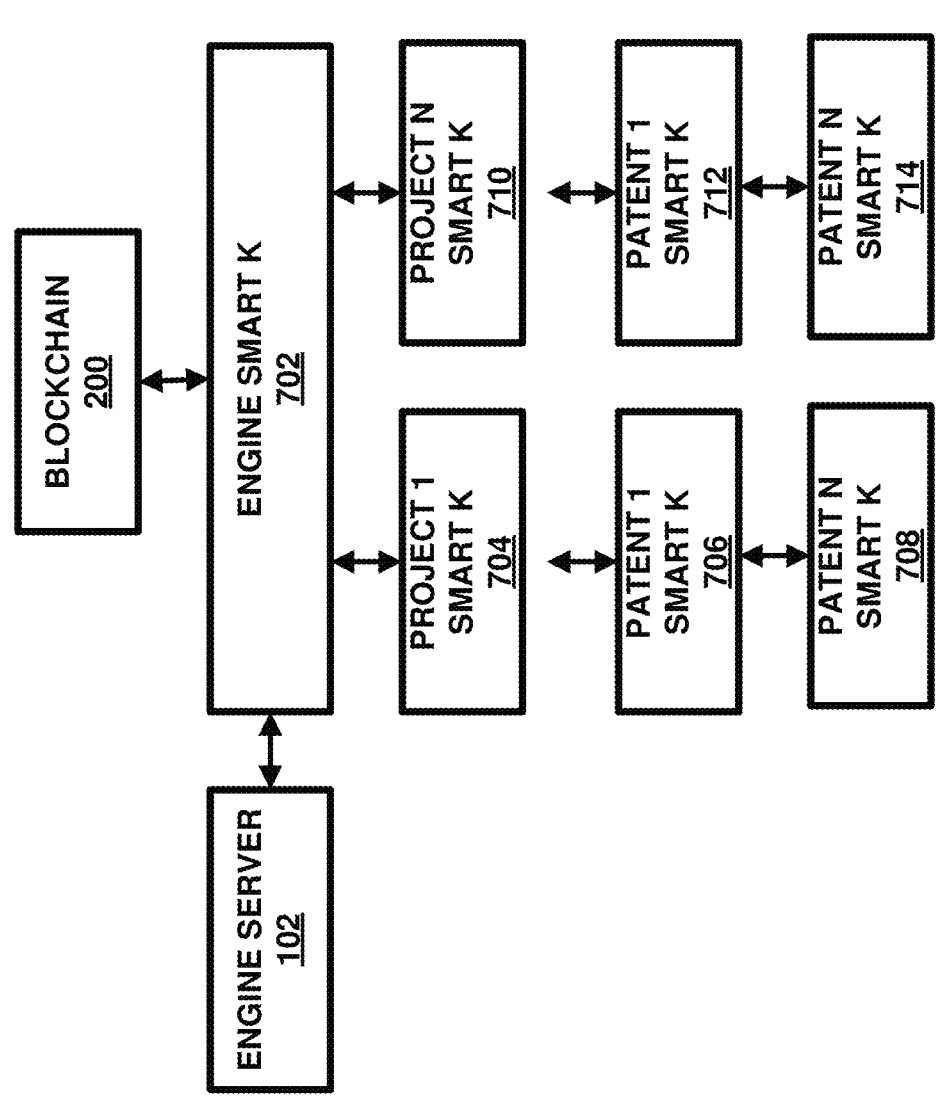
FIG. 7 is a diagram for illustrative systems and methods for performing smart contracts, and the like, employed in the innovation ecosystem engine of FIGS. 1-6 and 8-16.

FIG. 7 is a diagram for illustrative systems and methods 700 for performing smart contracts, and the like, employed in the innovation ecosystem engine of FIGS. 1-6 and 8-16. In FIG. 7, the systems and methods 700 for performing smart contracts can include the engine server 102 generating an engine smart contract at 702 based on the blockchain system at 200, and the like. The engine smart contract 702 can include other smart contracts related to respective projects 704 and 710, each with respect to patent smart contract

706 and 712, as well as smart contracts for any other patents at 708 and 714, and the like, for example, for implementing the systems and methods, as described with respect to FIGS. 3A-3F and 4-5, and the like.

FIG. 8 is a diagram for illustrative systems and methods 800 for performing equity splits, and the like, employed in the innovation ecosystem engine of FIGS. 1-7 and 9-16. In FIG. 8, the system and methods 800 include the engine server 102 tracking patent application information at 802, including first and second inventors of respective claims directed to respective features one and two at 804, and with a patent granted with features one and two at 806 with the named inventors at 810. Based on such information, the engine server 102 calculates and records a 50/50 split minus the baseline monetization (e.g., 10%) in a smart contract at 812.

Similarly, the engine server 102 tracking patent application information at 814, including first and second inventors, but with claims directed to only features one at 816, and with a patent granted with feature one at 818 with the named inventor at 820. Based on such information, the engine server 102 calculates and records no equity split minus the baseline monetization (e.g., 10%) in a smart contract at 822. Accordingly, the engine server 102 calculates the equity splits based on the actual inventors of the granted patent. Advantageously, this simplifies processing and avoids arguments between inventors with respect to which feature is more valuable and/or the value thereof.

Figures 9, 10:
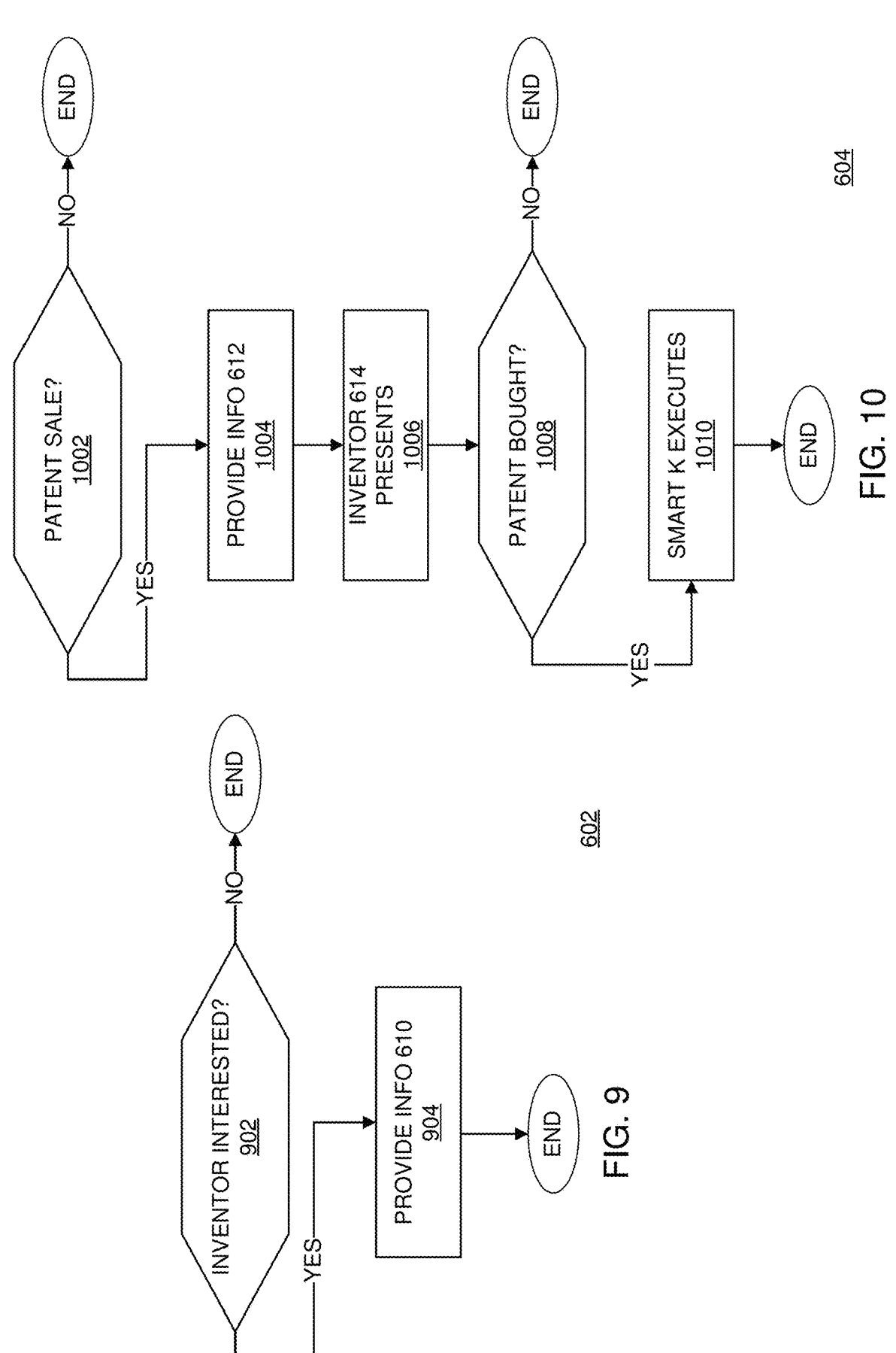
FIGS. 9-12 are flowcharts for illustrating operation of the systems and methods, and the like, employed in the innovation ecosystem engine of FIGS. 1-8 and 13-16.

FIGS. 9-12 are flowcharts for illustrating operation of the systems and methods, and the like, employed in the innovation ecosystem engine of FIGS. 1-8 and 13-16. In FIG. 9, the processing regarding 602 for recruiting inventors from FIG. 6 can include the gallery server 600 determining if an inventor is interested or not at 902, and if so providing the relevant information 610 at 904, otherwise completing the process.

In FIG. 10, the processing regarding 604 for patent sales from FIG. 6 can include the gallery server 600 determining if a patent is for sale or not at 1002, and if so providing the relevant information 612 at 1004, otherwise completing the process. At 1006, the inventor or virtual agent can present the information, and determine at 1008 whether or not the patent is to be bought via a respective buyer's wallet 108, and if so the relevant smart contract executes at 1010, otherwise completing the process.

Figures 11, 12:
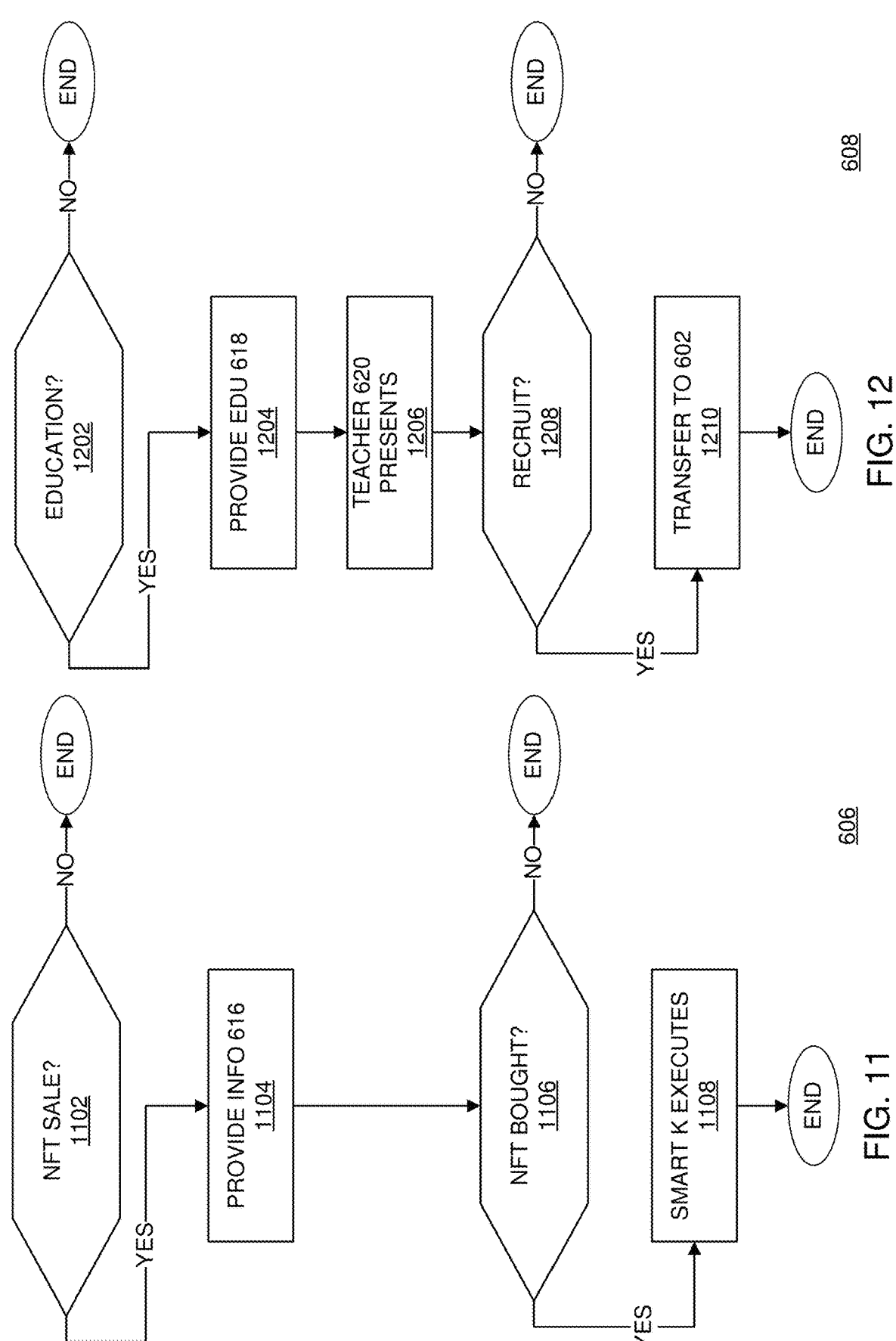

In FIG. 11, the processing regarding 606 for NFT sales from FIG. 6 can include the gallery server 600 determining if an NFT is for sale or not at 1102, and if so providing the relevant information 616 via the artist or virtual agent at 1104, otherwise completing the process. At 1106 gallery server 600 can determine whether or not the NFT is to be bought via a respective buyer's wallet 108, and if so the relevant smart contract executes at 1108, otherwise completing the process.

In FIG. 12, the processing regarding 608 for IP education from FIG. 6 can include the gallery server 600 determining if IP education is requested at 1202, and if so providing the relevant information 618 at 1204, otherwise completing the process. At 1206, the teacher or virtual agent can present the information, and determine at 1208 whether or not the inventor wants to be recruited, and if so at 120 transfer processing to 602 for recruiting the inventor, otherwise completing the process.

Figure 13A:
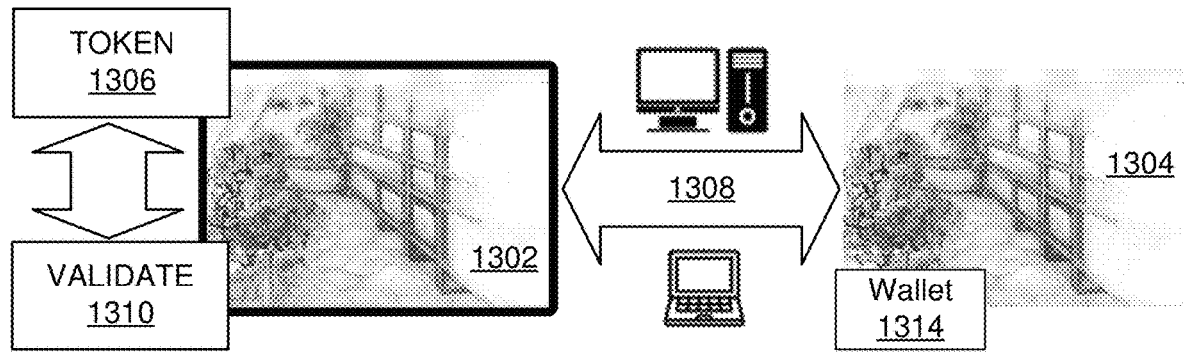
FIGS. 13A-13B are diagrams for illustrative systems and methods of securing NFTs with RFIDs, and the like, employed in the innovation ecosystem engine of FIGS. 1-7 and 9-16.
Figure 13B:
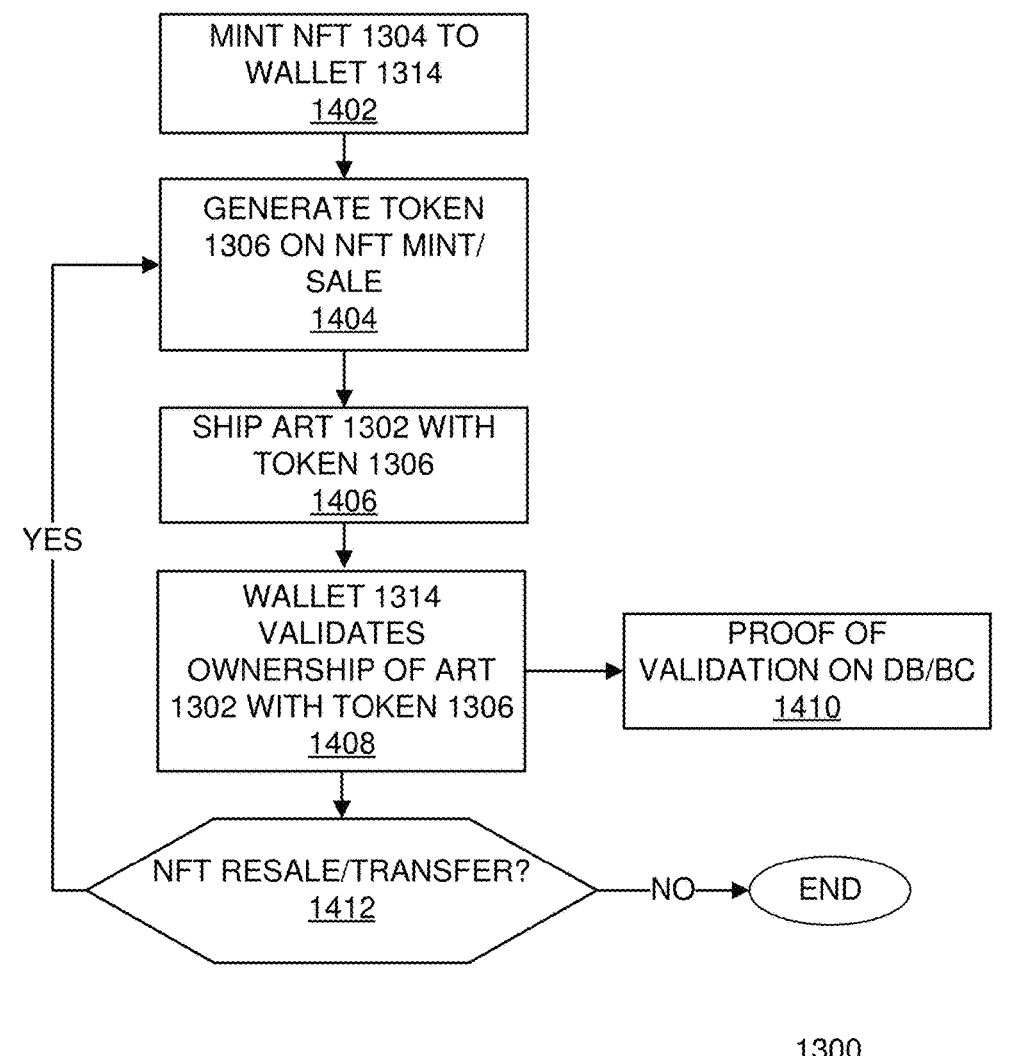

FIGS. 13A-13B are diagrams for illustrative systems and methods of securing NFTs with RFIDs, and the like, employed in the innovation ecosystem engine of FIGS. 1-7 and 9-16 with respect to NFT sales from 606 from FIG. 6.

In FIG. 13A, an NFT 1302 is associated with a token 1306 which is validated at 1310. The validated NFT 1302 and token 1306 is transferred via process 1308 to a wallet 1314 of a user as validated NFT 1304 stored the user's wallet 1314. Advantageously, without the validated token 1306, any copies of the original NFTs 1302 can be determined to be counterfeits, and the like. This process also can be used for authenticating physical paintings 1302, so that the physical painting is sent along with the token 1306 used to prove authenticity of the physical painting 1302.

Figure 14:
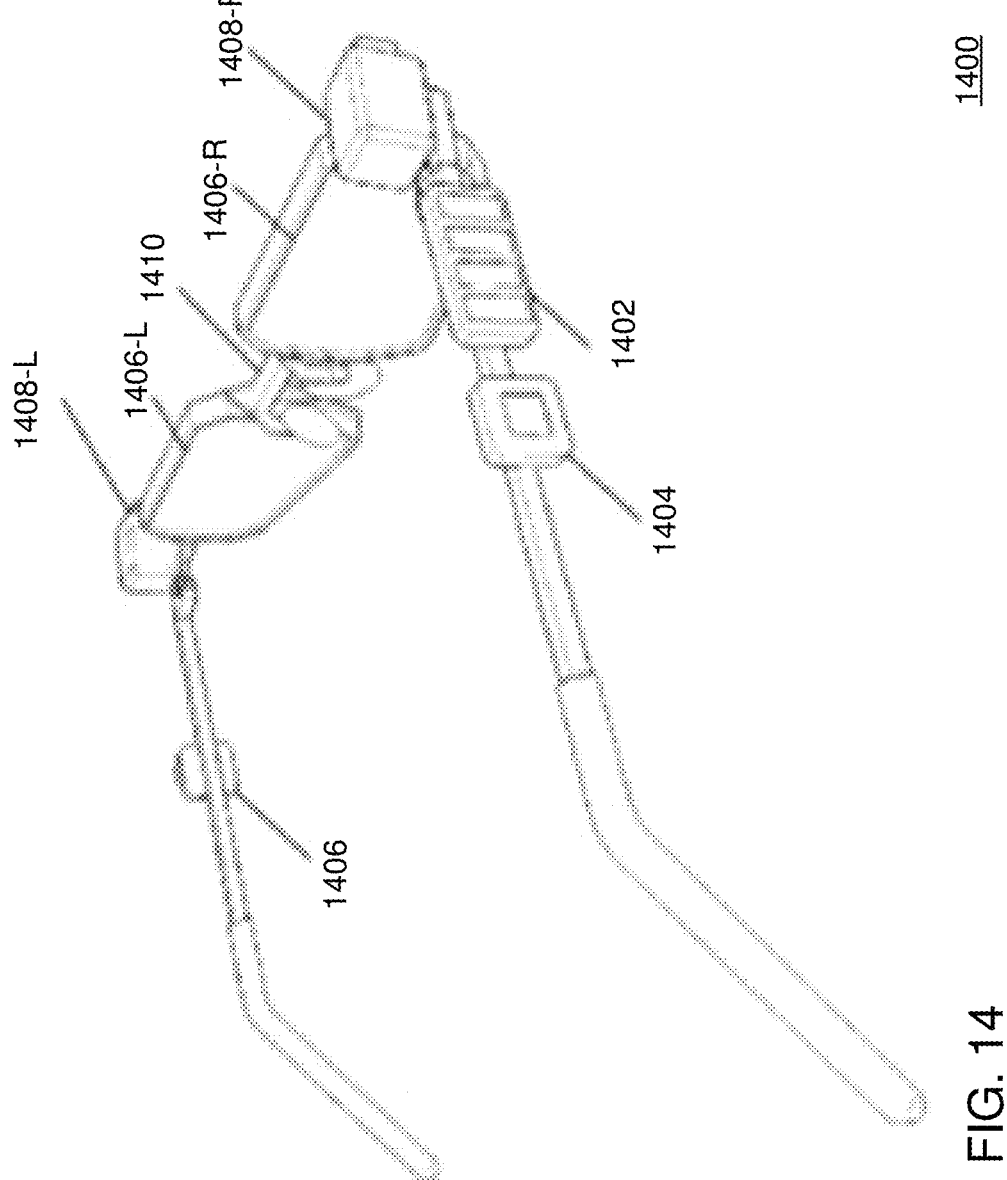
FIG. 14 is a diagram for an illustrative AR/VR apparatus, and the like, employed in the innovation ecosystem engine of FIGS. 1-13 and 15-16.

FIG. 14 is a diagram for an illustrative AR/VR apparatus, and the like, employed in the innovation ecosystem engine of FIGS. 1-13 and 15-16. In FIG. 14, the apparatus 1400 can be employed for AR/VR applications, and the like, and can include, for example, a head mounted display in the form a pair of glasses or the like, without external power supply, processor, heat dissipation, and the like, being illustrated. The apparatus 1400 therein includes a processor 1402, a data store 1404, a communicator 1406, left and right stereo displays 1406-L and 1406-R, and left and right sensors 1408-L and 1408-R. In addition, the apparatus 2860 includes a body 1410 in the form of a pair of glasses, AR/VR headpiece, and the like, with the processor 1402, data store 1404, communicator 1406, left and right stereo displays 1406-L and 1406-R, and left and right sensors 1408-L and 1408-R disposed thereon. In the example illustrated, the left and right stereo displays 1406-L and 1406-R are disposed on the body 1410 such that when the body 1410 is worn the left and right stereo displays 1406-L and 1406-R would be arranged in front of, facing, and proximate the eyes of a wearer, for example so as to display stereo visual information to that wearer. Similarly, the left and right sensors 1408-L and 1408-R are shown disposed on the body 1410, such that when the body 1410 is worn the left and right sensors 1408-L and 1408-R would be arranged in left and right positions proximate and facing substantially outward from the wearer's eyes, for example, so as to capture stereo visual information, and the like, at least substantially comparable to that received by the wearer's eyes, and the like. Advantageously, any suitable configuration supporting the functions as described herein may be suitable, and can be utilized for various embodiments, as will be appreciated by those of ordinary skill in the AR/VR art(s), and the like.

Figure 15:
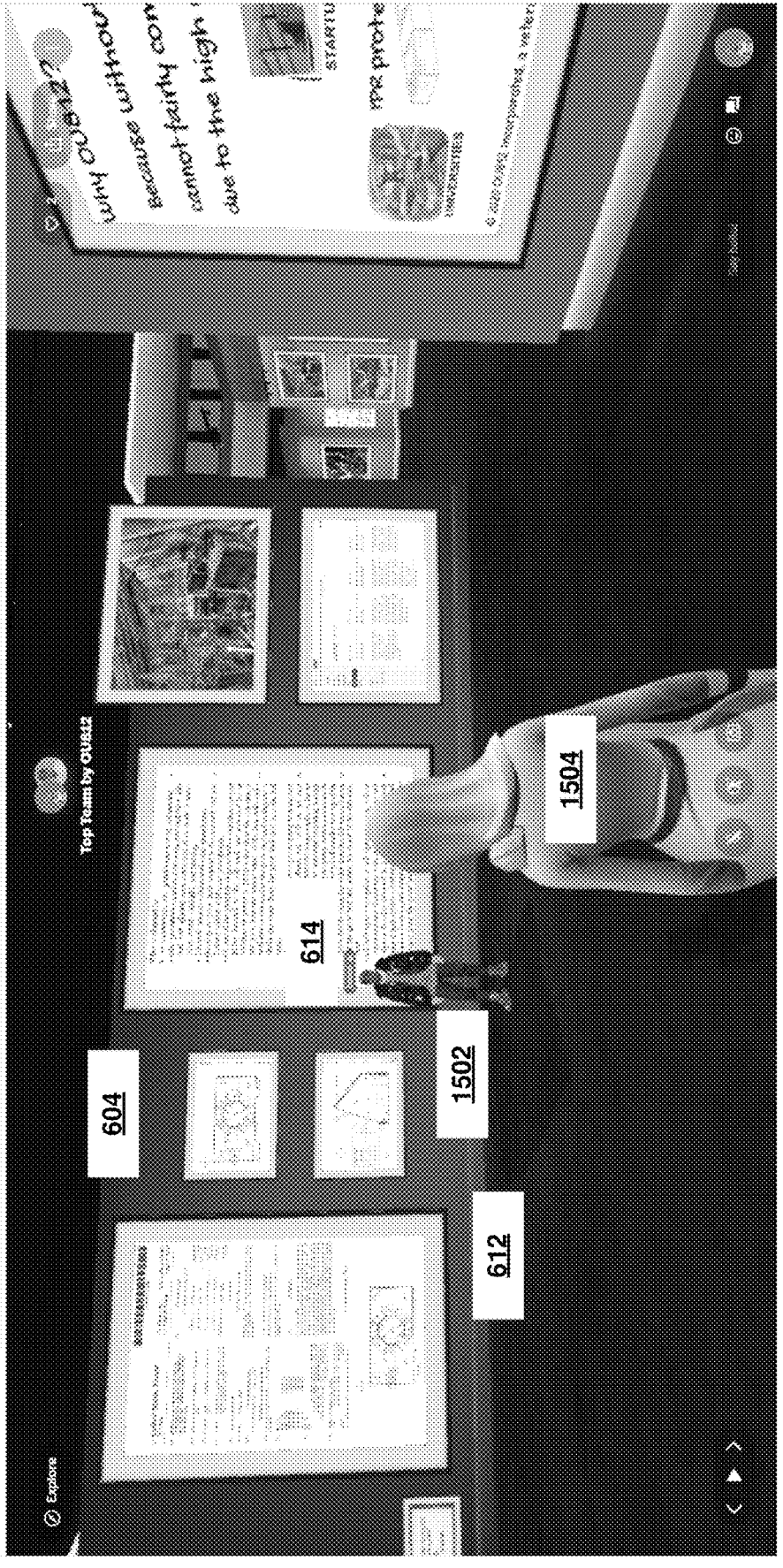
FIGS. 15-16 are user interface diagrams for illustrative systems and methods for a gallery server, and the like, employed in the innovation ecosystem engine of FIGS. 1-14.
Figure 16:
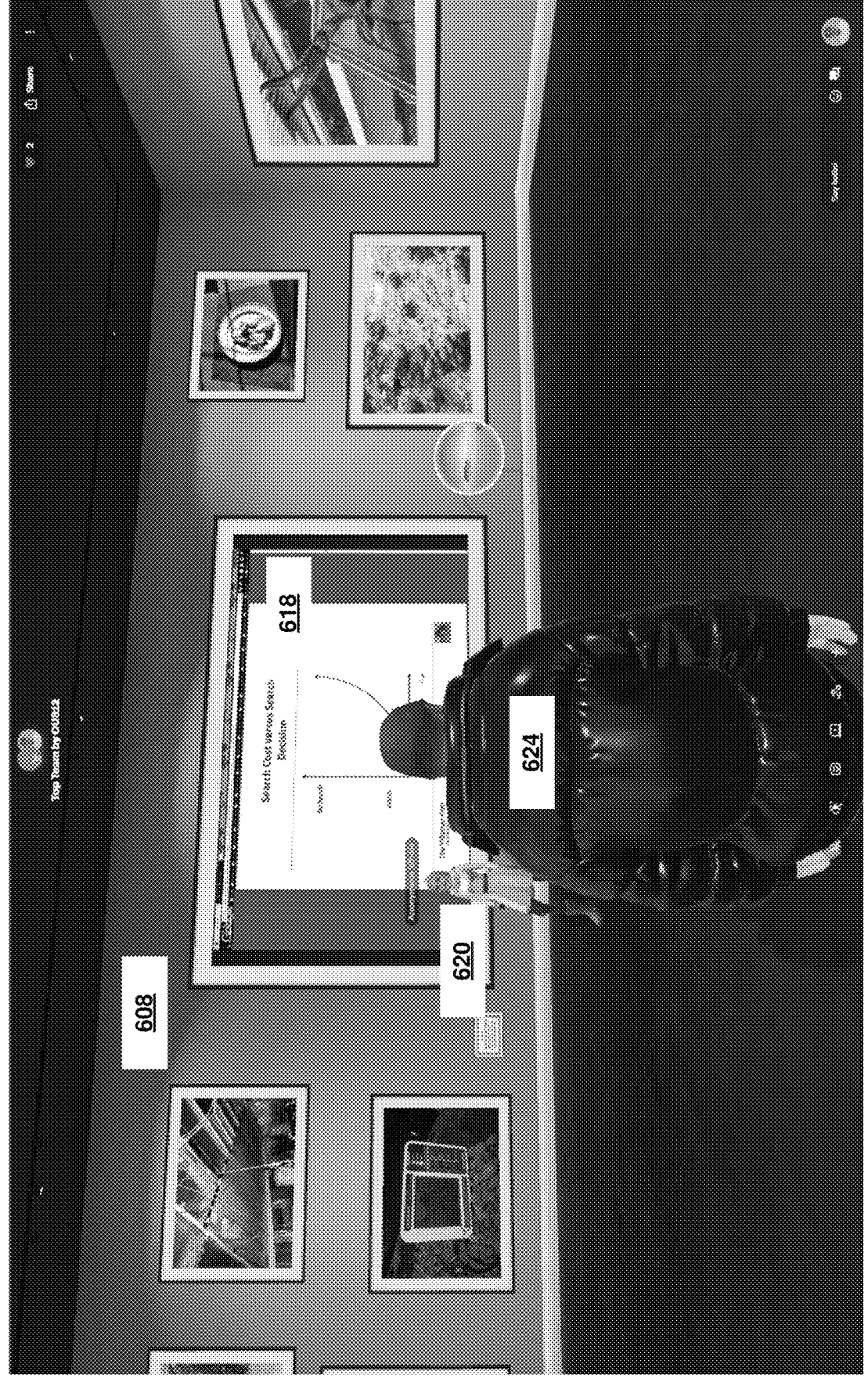

FIGS. 15-16 are user interface diagrams for illustrative systems and methods 600 for a gallery server, and the like, employed in the innovation ecosystem engine of FIGS. 1-14. In FIG. 15, for patents sales at 604, the gallery server 600 can provide information 612 regarding the patents 614 to potential buyers and ability to buy the patents 614 via the wallets 108, and the like. The information 612 can be provided, for example, by virtual avatar 1502 (e.g., AI powered) and/or by an actual inventor to a virtual avatar of a buyer 1504 via the gallery server user interface.

In FIG. 16, for IP education at 608, the gallery server 600 can provide information 618 regarding IP education to students 624, and the like. The information 618 can be provided, for example, by virtual teacher avatar 620 (e.g., AI powered) and/or by an actual teacher to a virtual avatar of a student 624 via the gallery server user interface.

Although the present disclosure is described in terms of assets, such as patents, and the like, the present disclosure is suitable for use with any suitable tangible and/or intangible assets, property, and the like, based on the teachings of the present disclosure, as will be appreciated by those of ordinary skill in the relevant art(s).

The above-described devices and subsystems of the illustrative embodiments can include, for example, any suitable servers, workstations, PCs, laptop computers, PDAs, Internet appliances, handheld devices, cellular telephones, wireless devices, other devices, and the like, capable of performing the processes of the illustrative embodiments. The devices and subsystems of the illustrative embodiments can communicate with each other using any suitable protocol and can be implemented using one or more programmed computer systems or devices.

One or more interface mechanisms can be used with the illustrative embodiments, including, for example, Internet access, telecommunications in any suitable form (e.g., voice, modem, and the like), wireless communications media, and the like. For example, employed communications networks or links can include one or more wireless communications networks, cellular communications networks, G3 communications networks, Public Switched Telephone Network (PSTNs), Packet Data Networks (PDNs), the Internet, intranets, a combination thereof, and the like.

It is to be understood that the devices and subsystems of the illustrative embodiments are for illustrative purposes, as many variations of the specific hardware used to implement the illustrative embodiments are possible, as will be appreciated by those skilled in the relevant art(s). For example, the functionality of one or more of the devices and subsystems of the illustrative embodiments can be implemented via one or more programmed computer systems or devices.

To implement such variations as well as other variations, a single computer system can be programmed to perform the special purpose functions of one or more of the devices and subsystems of the illustrative embodiments. On the other hand, two or more programmed computer systems or devices can be substituted for any one of the devices and subsystems of the illustrative embodiments. Accordingly, principles and advantages of distributed processing, such as redundancy, replication, and the like, also can be implemented, as desired, to increase the robustness and performance of the devices and subsystems of the illustrative embodiments.

The devices and subsystems of the illustrative embodiments can store information relating to various processes described herein. This information can be stored in one or more memories, such as a hard disk, optical disk, magneto-optical disk, RAM, and the like, of the devices and subsystems of the illustrative embodiments. One or more databases of the devices and subsystems of the illustrative embodiments can store the information used to implement the illustrative embodiments of the present disclosure. The databases can be organized using data structures (e.g., records, tables, arrays, fields, graphs, trees, lists, and the like) included in one or more memories or storage devices listed herein. The processes described with respect to the illustrative embodiments can include appropriate data structures for storing data collected and/or generated by the processes of the devices and subsystems of the illustrative embodiments in one or more databases thereof.

All or a portion of the devices and subsystems of the illustrative embodiments can be conveniently implemented using one or more general purpose computer systems, microprocessors, digital signal processors, micro-controllers, and the like, programmed according to the teachings of the illustrative embodiments of the present disclosure, as will be appreciated by those skilled in the computer and software arts. Appropriate software can be readily prepared by programmers of ordinary skill based on the teachings of the illustrative embodiments, as will be appreciated by those skilled in the software art. Further, the devices and subsystems of the illustrative embodiments can be implemented on the World Wide Web. In addition, the devices and subsystems of the illustrative embodiments can be implemented by the preparation of application-specific integrated circuits or by interconnecting an appropriate network of conventional component circuits, as will be appreciated by those skilled in the electrical art(s). Thus, the illustrative embodiments are not limited to any specific combination of hardware circuitry and/or software.

Stored on any one or on a combination of computer readable media, the illustrative embodiments of the present disclosure can include software for controlling the devices and subsystems of the illustrative embodiments, for driving the devices and subsystems of the illustrative embodiments, for enabling the devices and subsystems of the illustrative embodiments to interact with a human user, and the like. Such software can include, but is not limited to, device drivers, firmware, operating systems, development tools, applications software, and the like. Such computer readable media further can include the computer program product of an embodiment of the present disclosure for performing all or a portion (if processing is distributed) of the processing performed in implementing the disclosure. Computer code devices of the illustrative embodiments of the present disclosure can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the illustrative embodiments of the present disclosure can be distributed for better performance, reliability, cost, and the like.

As stated above, the devices and subsystems of the illustrative embodiments can include computer readable medium or memories for holding instructions programmed according to the teachings of the present disclosure and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present disclosure has been described in connection with a number of illustrative embodiments, and implementations, the present disclosure is not so limited, but rather cover various modifications, and equivalent arrangements, which fall within the purview of the appended claims.

10

What is claimed is:

1. A system for computer based open innovation, the system comprising:
an engine server implementing an open innovation engine for determining a baseline monetization based on one or more monetization events, including one of portfolio sales, and/or profits from startups, products and/or services;
the open innovation engine configured to generate and execute smart contracts, including blockchain smart contracts, with respect to terms for development and monetization of one or more portfolios, including patent portfolios associated with the one or more monetization events;
the smart contracts allocating a predetermined portion of monetization event proceeds as the baseline monetization for operating costs and for funding further projects;
one or more inventor devices associated with the one or more monetization events; and
one or more team member devices associated with the one or more monetization events, including one or more patent attorney team members, finance team members, and/or marketing team members;
the engine server configured to perform virtual ledger blockchain operations to validate occurrence of the monetization events, update the virtual ledger, and automatically issue tokens based on generated valuations of the respective portfolios, the generated valuations comprising artificial intelligence-based, rules-based, and blockchain-based valuations;
the tokens being configured to track value of the portfolios automatically in response to validated monetization events and to distribute profits to the baseline monetization, the one or more inventors, and the one or more team members in accordance with the executed smart contracts;
a gallery server integrated with the open innovation engine and configured to recruit inventors via AI-powered and/or human virtual recruiting assistants, provide for patent or non-fungible token sales via crypto wallets, and deliver intellectual property education via AI-powered and/or human instructors; and
the open innovation engine and gallery server configured to support secure innovation transactions.

2. The system of claim 1, wherein the open innovation engine determines and equity split between the inventors based on the named inventors on an issued patent minus the baseline monetization.

3. The system of claim 1, wherein the open innovation engine implements the gallery server that performs WEB 3.0, virtual reality (VR), and/or augmented reality (AR) services, including services for recruiting inventors, providing for patents sales, providing for non-fungible token (NFT) sales, and/or intellectual property (IP) education.

4. The system of claim 3, wherein for the recruiting inventors, the gallery server provides information regarding an open innovation community at to potential inventors provided by virtual recruiting assistants, including AI powered virtual recruiting assistants and/or by actual human recruiters via a gallery server user interface.

5. The system of claim 3, wherein for patents or NFT sales, the gallery server provides information regarding the patents or NFTs to potential buyers and an ability to buy the patents or NFTs via crypto wallets of the potential buyers, and the information is provided by virtual sales assistants, including AI powered virtual sales assistants and/or by actual human salesmen via a gallery server user interface.

6. The system of claim 3, wherein for IP education, the gallery server provides IP education information to potential students, and the IP education information is provided by virtual teaching assistants, including AI powered virtual teachers and/or by actual human teachers via a gallery server user interface.

7. A computer-implemented method for computer based open innovation, the method comprising:

determining, by an engine server implementing an open innovation engine, a baseline monetization based on one or more monetization events, including one of portfolio sales, and/or profits from startups, products and/or services;

generating and executing, by the open innovation engine, smart contracts, including blockchain smart contracts, with respect to terms for development and monetization of one or more portfolios, including patent portfolios associated with the one or more monetization events;

allocating, by the smart contracts, a predetermined portion of monetization event proceeds as the baseline monetization for operating costs and for funding further projects;

associating one or more inventor devices with the one or more monetization events;

associating one or more team member devices with the one or more monetization events, the one or more team member devices including one or more patent attorney team members, finance team members, and/or marketing team members;

performing, by the engine server, virtual ledger blockchain operations to validate occurrence of the monetization events, update the virtual ledger, and automatically issue tokens based on generated valuations of the respective portfolios, the generated valuations comprising artificial intelligence-based, rules-based, and blockchain-based valuations;

tracking, by the tokens, value of the portfolios automatically in response to validated monetization events and distributing profits to the baseline monetization, the one or more inventors, and the one or more team members in accordance with the executed smart contracts;

recruiting inventors, by a gallery server integrated with the open innovation engine, via AI-powered and/or human virtual recruiting assistants;

providing, by the gallery server, for patent or non-fungible token sales via crypto wallets;

delivering, by the gallery server, intellectual property education via AI-powered and/or human instructors; and supporting, by the open innovation engine and gallery server, secure innovation transactions.

8. The method of claim 7, wherein the open innovation engine determines and equity split between the inventors based on the named inventors on an issued patent minus the baseline monetization.

9. The method of claim 7, wherein the open innovation engine implements the gallery server that performs WEB 3.0, virtual reality (VR), and/or augmented reality (AR) services, including services for recruiting inventors, providing for patents sales, providing for non-fungible token (NFT) sales, and/or intellectual property (IP) education.

10. The method of claim 9, wherein for the recruiting inventors, the gallery server provides information regarding an open innovation community at to potential inventors provided by virtual recruiting assistants, including AI powered virtual recruiting assistants and/or by actual human recruiters via a gallery server user interface.

11. The method of claim 9, wherein for patents or NFT sales, the gallery server provides information regarding the patents or NFTs to potential buyers and an ability to buy the patents or NFTs via crypto wallets of the potential buyers, and the information is provided by virtual sales assistants, including AI powered virtual sales assistants and/or by actual human salesmen via a gallery server user interface.

12. The method of claim 9, wherein for IP education, the gallery server provides IP education information to potential students, and the IP education information is provided by virtual teaching assistants, including AI powered virtual teachers and/or by actual human teachers via a gallery server user interface.

13. A non-transitory computer-readable medium for computer based open innovation and with instructions stored thereon, that when executed by a processor, perform the steps comprising:

determining, by an engine server implementing an open innovation engine, a baseline monetization based on one or more monetization events, including one of portfolio sales, and/or profits from startups, products and/or services;

generating and executing, by the open innovation engine, smart contracts, including blockchain smart contracts, with respect to terms for development and monetization of one or more portfolios, including patent portfolios associated with the one or more monetization events;

allocating, by the smart contracts, a predetermined portion of monetization event proceeds as the baseline monetization for operating costs and for funding further projects;

associating one or more inventor devices with the one or more monetization events;

associating one or more team member devices with the one or more monetization events, the one or more team member devices including one or more patent attorney team members, finance team members, and/or marketing team members;

performing, by the engine server, virtual ledger blockchain operations to validate occurrence of the monetization events, update the virtual ledger, and automatically issue tokens based on generated valuations of the respective portfolios, the generated valuations comprising artificial intelligence-based, rules-based, and blockchain-based valuations;

tracking, by the tokens, value of the portfolios automatically in response to validated monetization events and distributing profits to the baseline monetization, the one or more inventors, and the one or more team members in accordance with the executed smart contracts;

recruiting inventors, by a gallery server integrated with the open innovation engine, via AI-powered and/or human virtual recruiting assistants;

providing, by the gallery server, for patent or non-fungible token sales via crypto wallets;

delivering, by the gallery server, intellectual property education via AI-powered and/or human instructors; and supporting, by the open innovation engine and gallery server, secure innovation transactions.

14. The computer-readable medium of claim 13, wherein the open innovation engine determines and equity split between the inventors based on the named inventors on an issued patent minus the baseline monetization.

15. The computer-readable medium of claim 13, wherein the open innovation engine implements the gallery server that performs WEB 3.0, virtual reality (VR), and/or augmented reality (AR) services, including services for recruiting inventors, providing for patents sales, providing for non-fungible token (NFT) sales, and/or intellectual property (IP) education.

16. The computer-readable medium of claim 15, wherein for the recruiting inventors, the gallery server provides information regarding an open innovation community at to potential inventors provided by virtual recruiting assistants, including AI powered virtual recruiting assistants and/or by actual human recruiters via a gallery server user interface.

17. The computer-readable medium of claim 15, wherein for patents or NFT sales, the gallery server provides information regarding the patents or NFTs to potential buyers and an ability to buy the patents or NFTs via crypto wallets of the potential buyers, and the information is provided by virtual sales assistants, including AI powered virtual sales assistants and/or by actual human salesmen via a gallery server user interface.

18. The computer-readable medium of claim 15, wherein for IP education, the gallery server provides IP education information to potential students, and the IP education information is provided by virtual teaching assistants, including AI powered virtual teachers and/or by actual human teachers via a gallery server user interface.

* * * * *